(12) United States Patent
Wexler et al.

(10) Patent No.: US 8,635,330 B2
(45) Date of Patent: Jan. 21, 2014

(54) METHOD AND SYSTEM FOR LEARNING WEB APPLICATIONS

(75) Inventors: Asaf Wexler, Raanana (IL); Yoav Dembak, Petah Tikwa (IL)

(73) Assignee: VMware, Inc., Palo Alto, CA (US)

( * ) Notice: Subject to any disclaimer, the term of this patent is extended or adjusted under 35 U.S.C. 154(b) by 1296 days.

(21) Appl. No.: 11/738,567

(22) Filed: Apr. 23, 2007

(65) Prior Publication Data
US 2007/0250624 A1 Oct. 25, 2007

Related U.S. Application Data

(60) Provisional application No. 60/745,520, filed on Apr. 24, 2006.

(51) Int. Cl.
*G06F 15/173* (2006.01)
(52) U.S. Cl.
USPC ............................ 709/224; 709/231; 709/238

(58) Field of Classification Search
USPC ................................ 709/223–224, 231, 238
See application file for complete search history.

(56) References Cited

U.S. PATENT DOCUMENTS

| | | | |
|---|---|---|---|
| 6,182,146 B1 * | 1/2001 | Graham-Cumming, Jr. | 709/224 |
| 6,651,099 B1 * | 11/2003 | Dietz et al. | 709/224 |
| 6,792,393 B1 | 9/2004 | Farel et al. | |
| 7,356,027 B1 * | 4/2008 | Parekh et al. | 709/217 |
| 2005/0079478 A1 | 4/2005 | McKeagney et al. | |
| 2005/0120054 A1 | 6/2005 | Shulman et al. | |
| 2005/0267962 A1 * | 12/2005 | Svetoslavov et al. | 709/224 |
| 2006/0212492 A1 | 9/2006 | Jacobs et al. | |
| 2006/0277288 A1 * | 12/2006 | Kelly et al. | 709/224 |
| 2007/0011317 A1 * | 1/2007 | Brandyburg et al. | 709/224 |

* cited by examiner

*Primary Examiner* — Patrice Winder
*Assistant Examiner* — Nam Tran

(57) ABSTRACT

A method and system for automatically learning and identifying web applications. The method discovers and identifies transactions, web applications, their modules, interfaces, and relationship between the modules. The method further includes dynamically creating application definers is provided.

40 Claims, 8 Drawing Sheets

US 8,635,330 B2

METHOD AND SYSTEM FOR LEARNING WEB APPLICATIONS

CROSS REFERENCE TO RELATED APPLICATIONS

This application claims the benefit of U.S. provisional application 60/745,520 filed on Apr. 24, 2006, which is hereby incorporated by reference for all that it contains.

TECHNICAL FIELD

The present invention relates generally to controlling and managing the performance of web applications, and more practically for learning web applications.

BACKGROUND OF THE INVENTION

Enterprises and organizations expose their business information and functionality on the web through software applications, usually referred to as "web applications." Web applications provide great opportunities for an organization. The web applications use the Internet technologies and infrastructures. These applications are generally event-driven software programs which react to hyper text transfer protocol (HTTP) requests from the client. The applications are generally executed on application servers, constructed according to N-tier architecture, in which presentation, business logic, and data access layers are kept separate. Recently, the web applications have evolved into large-scale applications that demand more sophisticated computing services.

FIG. 1 shows an exemplary network system 100 that is utilized for executing web applications. System 100 includes clients 110-1 through 110-N, web servers 120-1 through 120-M, application servers 130-1 through 130-Q, back-end systems 150, a load balancer 160, and a network 170. Clients 110 submit requests (e.g., HTTP requests) to web servers 120 through network 170. Load balancer 160 distributes the requests among the servers 120 to balance the load between servers 120 and 130. Each of web servers 120 dynamically generates the presentation layer, for example, using servlets, or extensible markup language (XML), extensible style-sheet language (XSL), and the likes. Application servers 130 are often responsible for deploying and running the business logic layer and for interacting with and integrating various enterprise-wide resources, such as web servers 120, and back-end systems 150. The back-end systems 150 may include, for example, a database and a legacy system.

Current solutions for executing web applications fail to deliver services according to predefined service level agreements (SLAs). This is a major drawback as the ability to provide committed services increasingly becomes a competitive requirement. One of the reasons for this inability is the lack of a tool that manages, and controls the operation and load of web applications based on the applications' attribute. For example, if two web applications run on the same application server 120 one provides hotel information and the other runs reservation transactions, load between these applications is equally distributed, despite the fact that the latter application is more critical. In addition, load balancing between different modules of the same application cannot be performed by prior art solutions. As another example, for a financial web application having two modules, one for displaying the current stock price and the other for performing monetary transactions, serving requests targeted to the second module is fundamental.

In order to control web applications based on their attributes a mechanism that identifies and learns the applications executed over a system such as system 100 and the relation between applications' modules is required.

DETAILED DESCRIPTION OF THE INVENTION

Figure 1:
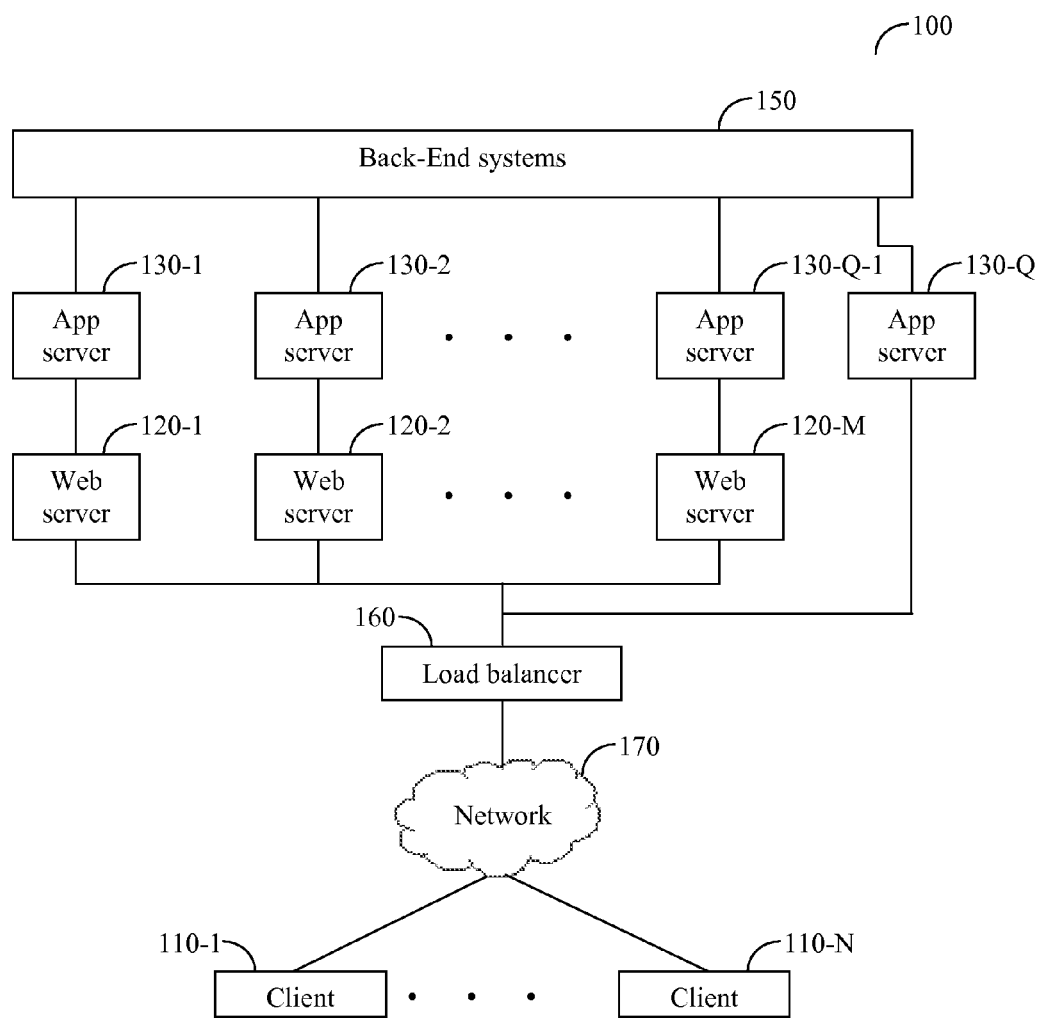
FIG. 1—is a prior art network system utilized for executing web applications.
Figure 2:
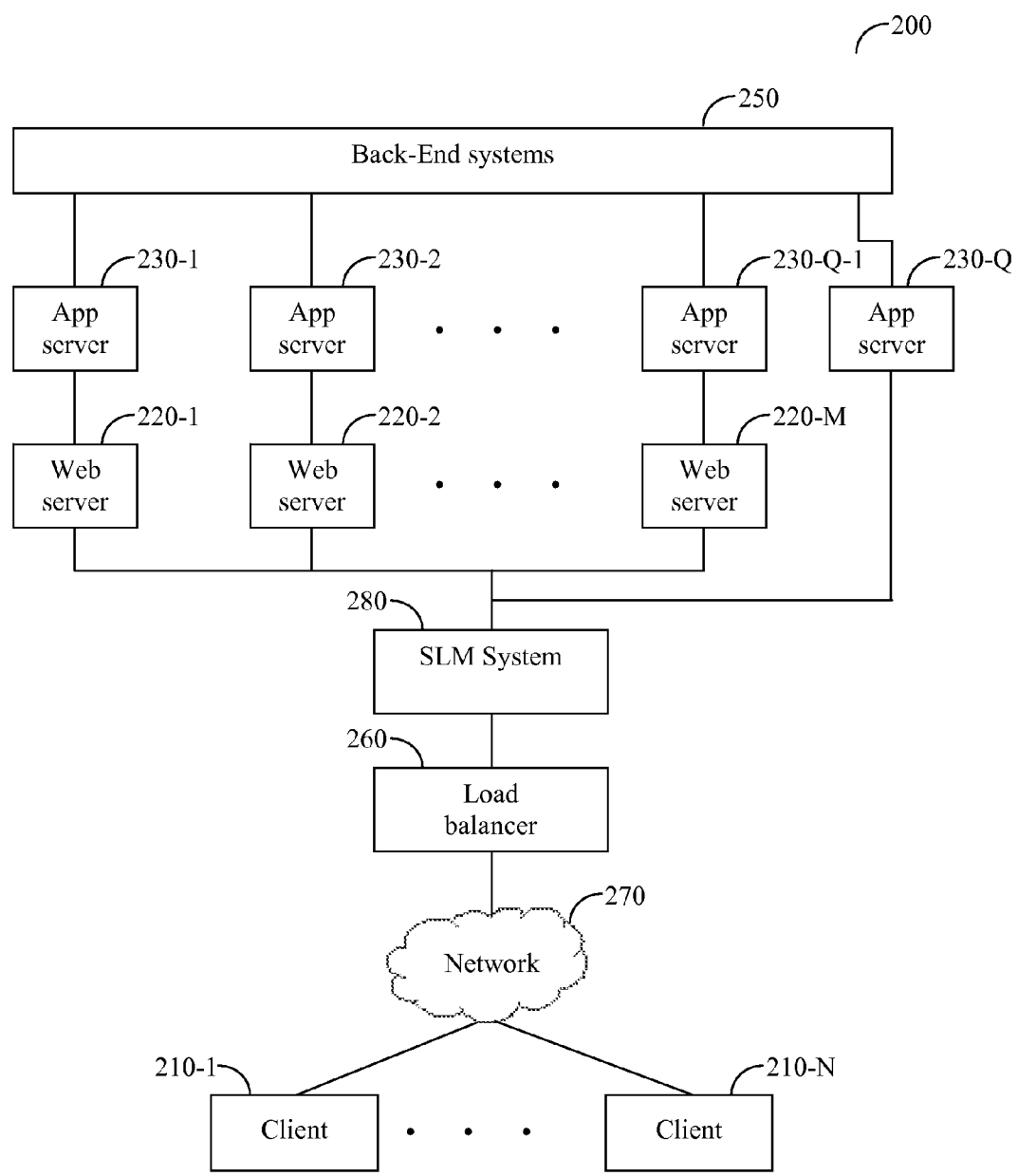
FIG. 2—is a diagram of a network system constructed in accordance with an exemplary embodiment of the present invention.

FIG. 2 shows an exemplary and non-limiting diagram of a network system 200 constructed in accordance with one embodiment of the present invention. System 200 includes clients 210-1 through 210-N, web servers 220-1 through 220-M, application servers 230-1 through 230-Q connected to backend systems 250, a load balancer 260, and a network 270. System 200 further includes a service level management (SLM) system 280 that allows maintaining a consistent level of service of web applications. Web servers 220 process requests sent from clients and respond with the processing result. Application servers 230 execute the business logic of the web applications and communicate with back-end systems 250, which implement the data layer of the applications. Load balancer 260 mainly distributes incoming requests to servers 220 and 230 that run the applications to which the requests are targeted.

SLM system 280 controls and manages applications executed by servers 220 and 230 in real-time, and thus ensures a committed level of service. The level of service may be defined by a service level agreement (SLA) and be different for each application. With this aim, SLM system 280 learns the structure of a web-application, monitors the operation of the application, and controls the processing of incoming requests to achieve optimal performance and level of service. The SLM system 280 further learns and identifies transactions targeted to web applications, from data traffic (e.g., HTTP requests and replies). The learning tasks are carried out by an application learning system (ALS) that is disclosed by the present invention. SLM system 280 is configured to operate in the line of traffic, i.e., traffic passing directly through system 280 to web servers 220. In one embodiment of the present invention, SLM system 280 is a passive sniffing device connected to system 200 through a dedicated communication link. An example for the operation of SLM system 280 may be found in U.S. patent application Ser. No. 11/682,426 entitled "A Service Level Management System", assigned to common assignee and is hereby incorporated for all that it contains.

Figure 3:
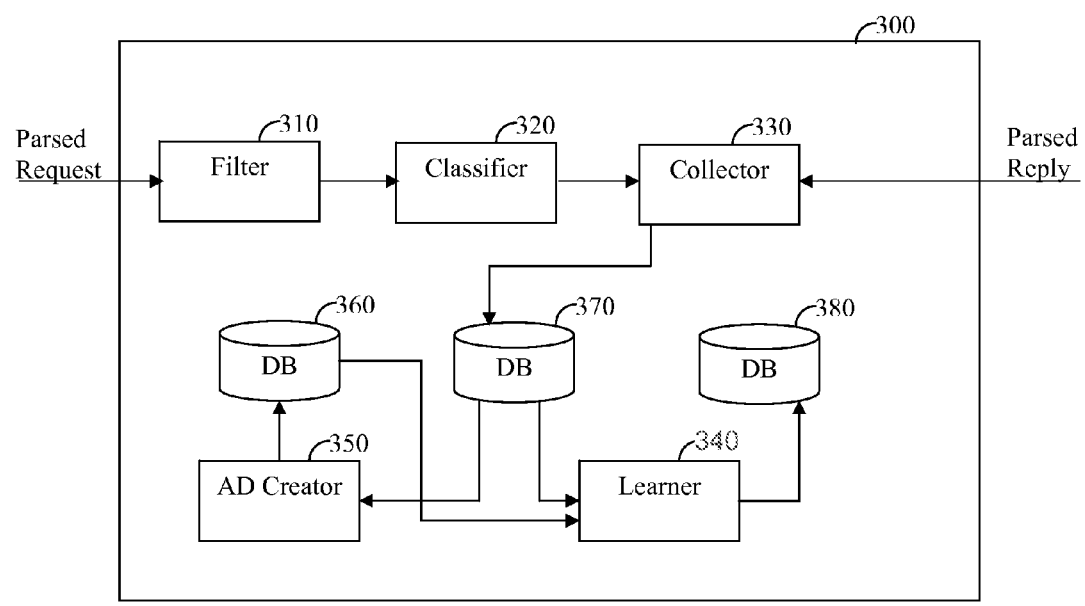
FIG. 3—is a block diagram of the ALS disclosed in accordance with an embodiment of the present invention.

FIG. 3 shows an exemplary and non-limiting diagram of an ALS 300 disclosed in accordance with one embodiment of the present invention. ALS 300 comprises a filter 310, a classifier 320, a collector 330, a learner 340, and an application definer (AD) creator 350. ALS 300 further includes databases 360, 370 and 380. ALS 300 receives as input parsed HTTP requests and replies. HTTP requests are submitted by clients 210 and replies are sent from servers 220 and/or 230. The request and replies are parsed to create contexts of the request. A context is a joined HTTP request-reply entity. The context fields include, but are not limited to, a site name, a HTTP method, a URL, request parameters, HTTP cookies, a HTTP status code, a HTTP server, a HTTP content type, a HTTP content length, a HTML title field, and the like.

Filter 310 filters the incoming parsed requests to determine whether a request is "relevant" or "irrelevant". Filter 310 marks a request as irrelevant if, for example, an HTTP method of the request is neither POST nor GET. Also, if the request's URL includes forbidden file extensions the request is irrelevant. These file extensions are predefined and kept in a list by filter 310. Other filtering schemes may be utilized to reduce the number of learnt applications. For example, static pages (i.e., replies with unchanged content) and requests that are automatically initiated by the browser may also be filtered. Requests that pass filter 310 (i.e., only "relevant requests") are classified by classifier 320. The classification includes determining, on-the-fly, for each parsed request, whether it belongs to a previously discovered application or transaction, and if so an application identification ("AppID") number is assigned to the request. Unidentified requests are collected and further processed for the purpose of learning new applications. All unidentified requests are marked. Collector 330 is activated upon a reception of a reply message and it decides if the context should be collected. That is, if a request corresponded to the received reply is marked, the context (i.e., a request-reply pair) is saved in database 370. Contexts to be collected are saved, in a chronological order, where each context is kept with all its fields.

Learner 340 may be invoked every predefined period of time or whenever the number of collected contexts is above a predefined threshold. Alternatively, learner 340 may be always active. Learner 340 processes data stored in database 370 and attempts to discover transactions with web applications and new applications using a plurality of application definers (ADs) and/or correlation processes. The ADs include conditions that are checked against context data in database 370. Examples for ADs are provided below. If one of the ADs is satisfied, then a new application is discovered. ADs are loaded to learner 340 from database 360, which includes a plurality of ADs that may be defined by the user or dynamically created by AD creator 350. The process for dynamically creating ADs is described in greater detail below.

The output of learner 340 includes identified transactions, web applications and application's modules. The learnt information is saved in a classify data structure (CDS) in database 380. The CDS represents a list of identified sites, for each site a list of its applications, and for each application a list of modules that construct the application. For that purpose, the CDS includes search modifiers, a URL entity locator table, and URL entities. Each URL entity holds the AppID and a URL of the identified application. The CDS is used, by classifier 320, in real-time to classify incoming requests to applications. That is, each request is classified to its location in the CDS and the respective AppID is assigned to the request. The classification allows for fast correlation between a request and application or module to provide a service level according to a SLA defined to the application or module.

Figure 4:
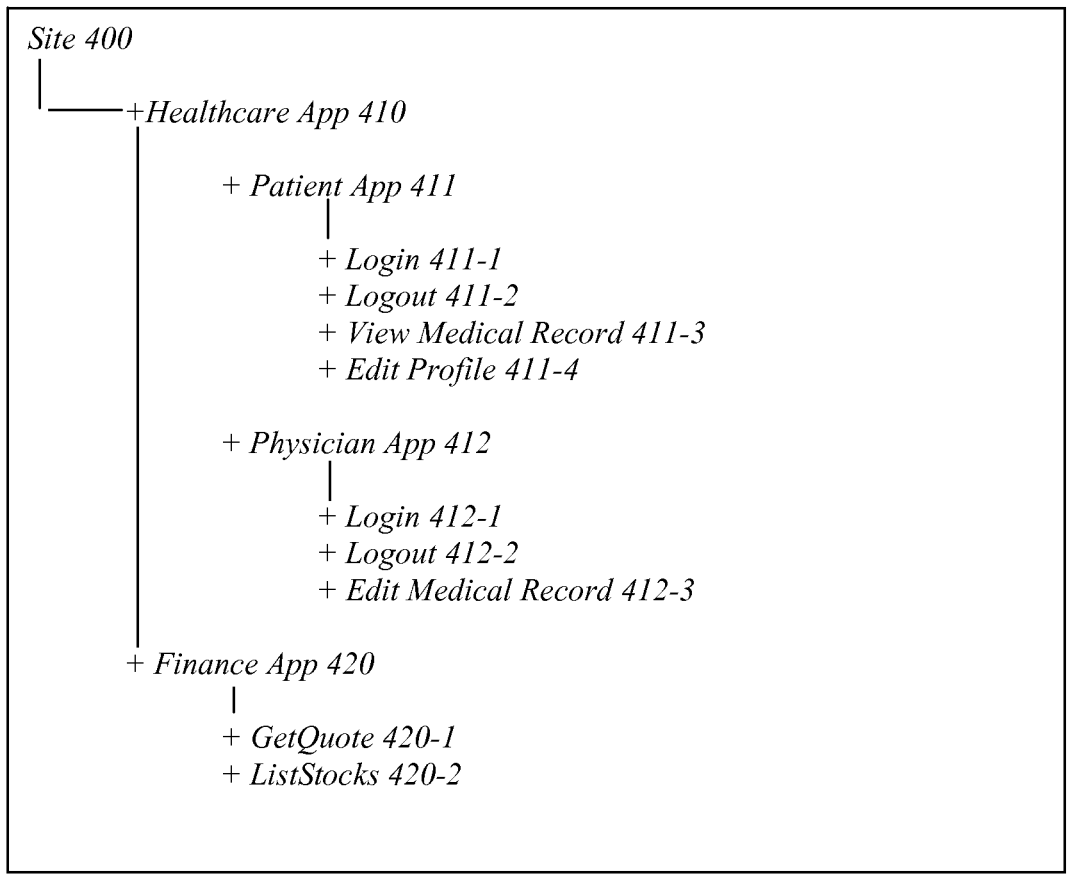
FIG. 4—is an illustration of a site tree.

The CDS is further used to generate a site tree, for display purposes, which includes all discovered transactions, applications and modules that belong to a designated site. FIG. 4 provides an example for a site tree. In this example, web site 400 has two applications: a healthcare 410 and finance 420. Healthcare application 410 is composed of two modules, a patient 411 and a physician 412. Patient application 411 includes the following transactions: Login 411-1, Logout 411-2, View Medical Record 411-3, and Edit Profile 411-4. Physician module 412-1 includes the transactions: Login 412-1, Logout 412-2, and Edit Medical Record 412-3. Finance application 420 includes only the transactions GetQuote 420-1 and ListStocks 420-1.

Figure 5:
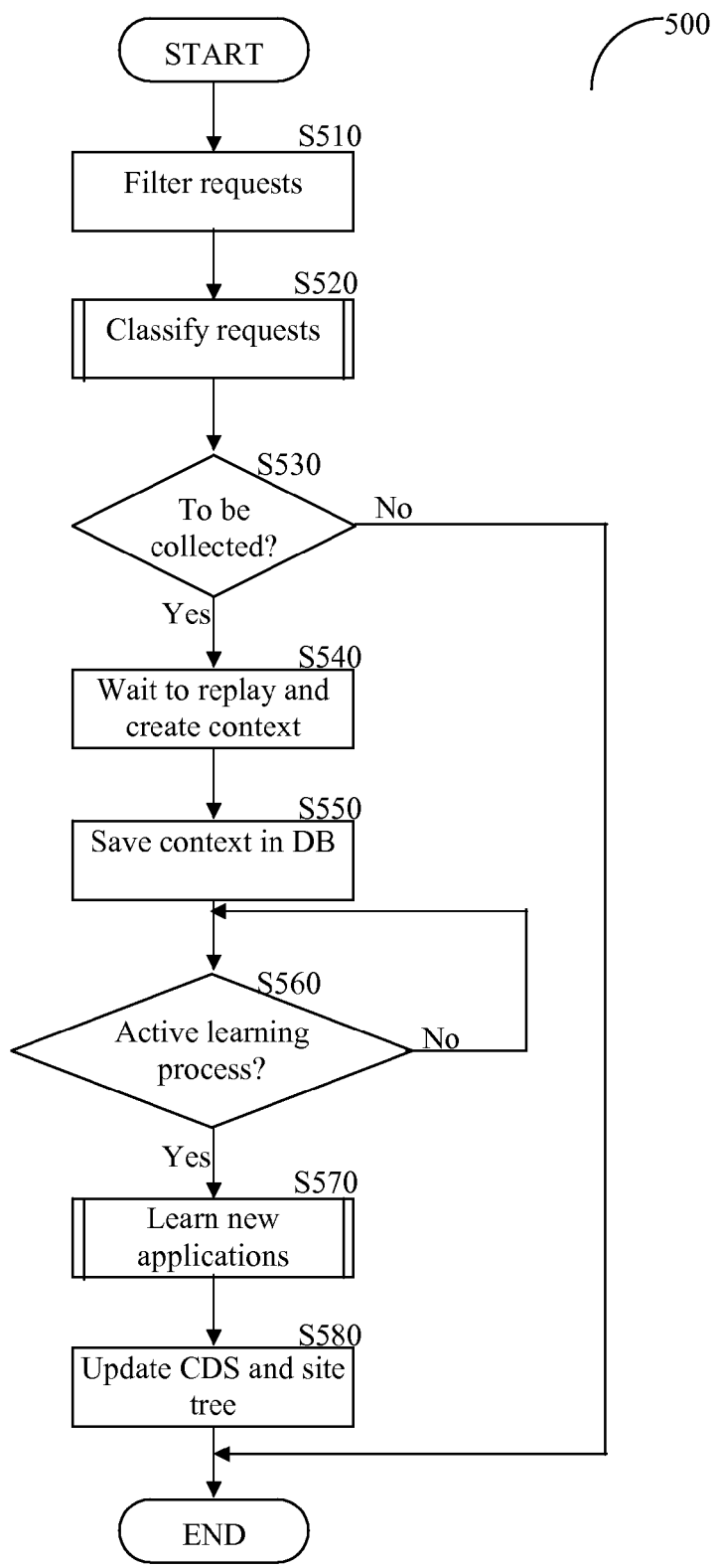
FIG. 5—is a flowchart describing the operation of the ALS disclosed in accordance with an embodiment of the present invention.

FIG. 5 shows an exemplary and non-limiting flowchart 500 describing the operation of ALS 300 in accordance with an embodiment of the present invention. At S510, incoming parsed requests are filtered in order to reduce the amount of data to be handled by ALS 300. Filtered requests are marked as irrelevant if they belong to applications that have not changed during the last session. Specifically, at least two filters are applied: 1) file extensions, i.e., filtering all requests having URLs that include designated extensions; and, 2) HTTP methods, i.e., filtering HTTP methods that are not GET or POST. At S520, all requests that were not filtered are classified to determine if they belong to an identified application (i.e., to an application in the CDS) or to an identified transaction.

Figure 6:
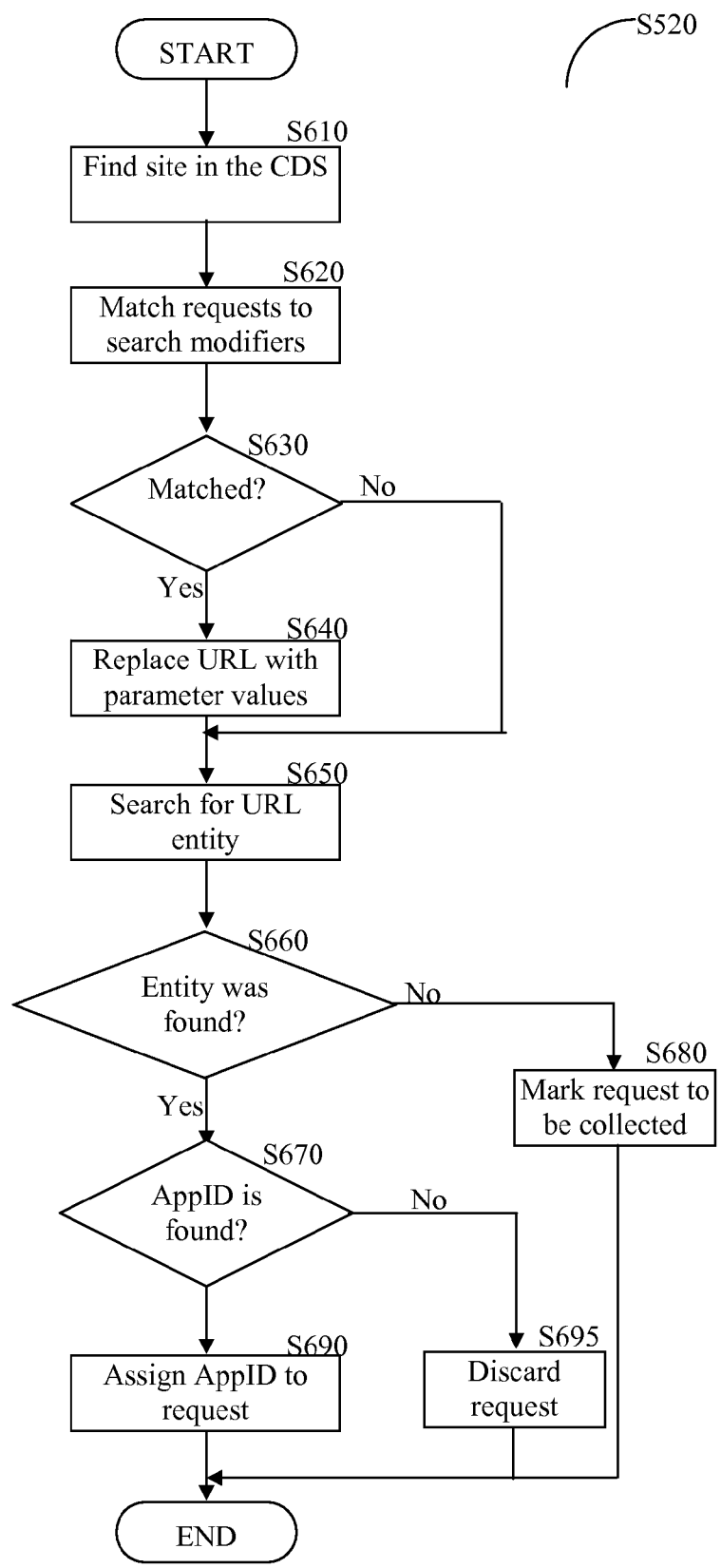
FIG. 6—is a flowchart describing the classification process disclosed in accordance with an embodiment of the present invention.

Referring to FIG. 6, where the execution of S520 is shown in detail. The classification is done against the CDS. As mentioned above, for each site the CDS includes search modifiers, an URL entity locator table, and URL entities. Each search modifier includes a plurality of conditions that are used for replacing a request URL with a parameter value. The modification is required mainly in cases where a request is designated to a site's common library but contains a parameter that indicates a real application. The URL entity locator table allows finding a URL entity. The locator table includes a set of conditions that are checked against the request and a hash table. Each application in the CDS is represented as a URL entity, which outputs the AppID based on a URL or a combination of request's parameters.

At S610, a site to which the request belongs to is identified in the CDS. At S620, the request is matched against the search modifiers of the identified site. At S630, a check is made to determine if the request should be modified, and if so execution continues with S640 where the URL in the request is replaced with one or more parameter values; otherwise, execution proceeds to S650. At S650, the URL entity locator table is searched in order to find a URL entity that matches the request. At S660, a check is made to determine if a URL entity was found, and if so execution continues with S670; otherwise, proceeding with S680 where the request is marked to be later collected by collector 340. At S670, a check is made to determine if the URL entity includes AppID, and if so at S690, the AppID is assigned to the request; otherwise, at S695 the request is discarded.

Referring back to FIG. 5, at S530 a check is made to determine if the request is marked and a reply needs to be collected, and if so continuing with S540; otherwise, execution ends. At S540 the process waits for a reply that corresponds to the marked request and upon receiving the reply an application context is created and saved, at S550, in database 370. At S560 it is determined whether the learning process should be activated by checking if a predefined time interval has elapsed from the last time that the process was executed or if the number of contexts in database 370 is above a predefined threshold. If "Yes" execution proceeds to S570, where the learning process is applied as will be described in detail with reference to FIG. 7; otherwise, execution waits at S560. At S580, the updated CDS and site tree are saved in database 380. The steps of the method of FIG. 5 can be performed in order or in parallel. In another embodiment of the present invention the ALS continuously learns, i.e., the learning process is always executed, and thus S560 is not required.

Figure 7:
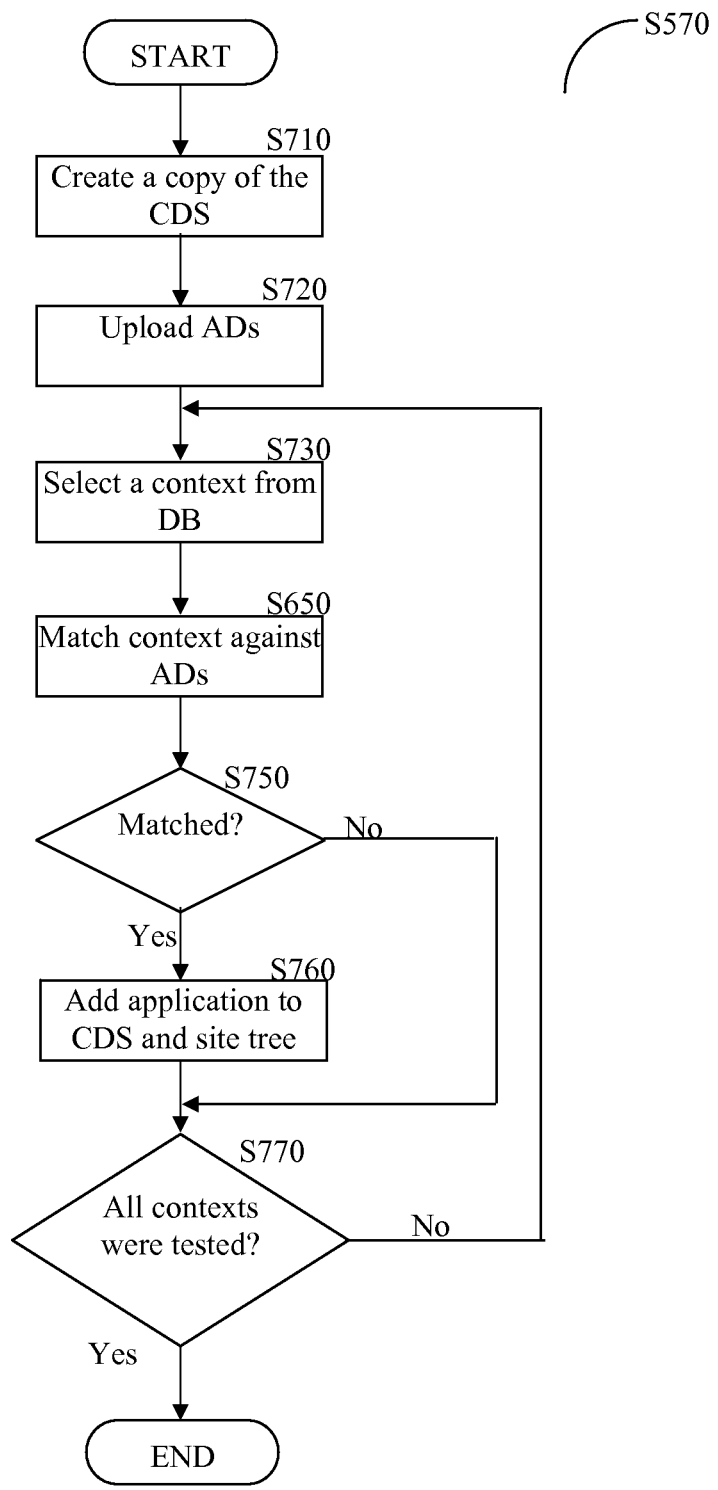
FIG. 7—is a flowchart describing the learning process disclosed in accordance with an embodiment of the present invention.

FIG. 7 shows an exemplary and non-limiting flowchart S570 describing the learning process in accordance with an embodiment of the present invention. At S710, a copy of the current CDS is created. At S720, ADs saved in database 360 are loaded to learner 340. The ADs include conditions that are checked against application context data. ADs in database 360 may be defined by the user and/or dynamically created by AD creator 350. Examples for ADs are: a string is in URL, a string is in prefix of URL, a parameter name exists in the context, a parameter name and its value exist in the context, a parameter name and a string is in its value exist in the context, a cookie's path, or any combination thereof. The check if the AD's conditions are satisfied is done against actual values, e.g., "is iam/an/application in URL", where iam/an/application is the string in the "is a string in URL" condition.

At S730 a single context is selected from database 370 and thereafter, at S740, the selected context is checked against each of the loaded ADs. At S750, it is determined if at least one of the ADs is satisfied, and if so execution continues with S760; otherwise, proceeding to S770. At S760 a new application is identified and inserted to the CDS in an entry of the relevant site. That is, a new URL entity is created and the new AppID assigned to the identified application together with its URL are added to the entity. The search modifiers and the URL entity locator table may also be updated to point to the new URL entry. In addition, the discovered application is added to the respective site tree. The name given to the discovered application in the site tree is derived from the unique part of the URL. In accordance with an embodiment of the present invention a compression process is utilized to reduce the size of the site trees. At S770, a check is made to determine if all contexts in database 370 where examined, and if so execution ends; otherwise, returning to S730 where another context is selected.

In accordance with an embodiment of the present invention transactions and web applications can be discovered by correlating a plurality of saved contexts that share a common property, such as URLs and parameters.

Figure 8:
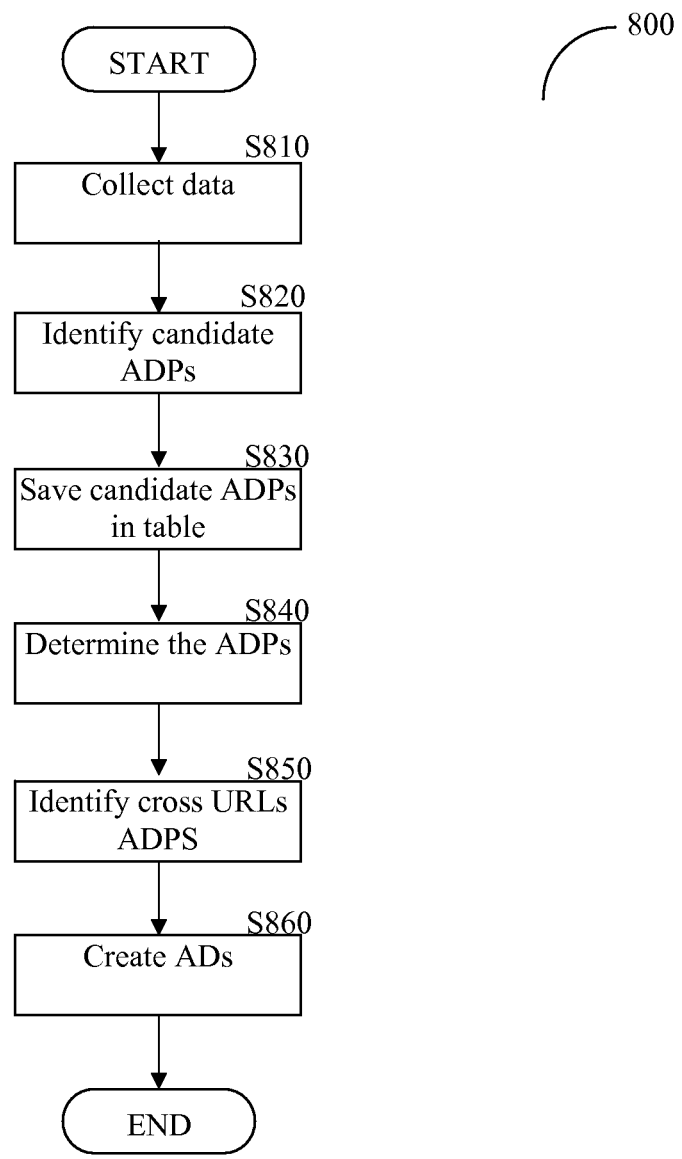
FIG. 8—is a flowchart describing the method for dynamically creating ADs disclosed in accordance with an embodiment of the present invention.

FIG. 8 shows an exemplary and non-limiting flowchart 800 describing the method for dynamically creating ADs in accordance with an embodiment of the present invention. The creation of ADs is based on detecting application defining parameters (ADPs) in each URL. An ADP is a parameter that for each application has a different value. At S810, data to be used in the AD creation process is collected. Specifically, the method collects previous HTML pages, i.e., pages of previous contexts. Detecting the previous context in database 370 is performed using an HTTP referrer header, while the HTML pages are collected upon a specific request from classifier 320. At S820, all parameters appearing in a URL of each previous context are identified and marked as candidate ADPs. At S830, all candidate ADPs are saved in an ADP table that includes for each URL a list of contexts where the URL exists and a table of candidate ADPs. Each candidate ADP entry includes a counter that counts the number of parameter appearances and a values table. Each entry in the values table holds the HTML title name and the number of appearances of the value. When a candidate ADP is inserted to the table its appearances counter is incremented, whereas if the parameter already exists in the table, only incrementing its appearance counter. Parameters are saved in the table according to their names.

At S840, from candidate parameters, the actual ADPs are determined. Specifically, two steps are taken by AD creator 350 to determine which of the parameters in the ADP table are considered as ADPs: a) finding suspected parameters; and b) disqualifying suspected parameters based on a plurality of criteria. The determination of which candidate ADP is a suspected parameter is based on at least one of: the candidate parameter appearances percentage, previous context HTML pages, and a context HTML Title field (in the value entry). For example, a parameter having an appearance counter above a predefined threshold (e.g., 90%), per a given URL, is considered as a suspected parameter. In HTML pages certain parameters in a form tag (<FORM>) and a 'a' tag (<a>) are considered as suspected parameters. A parameter is also suspected if changes in the parameter value correspond to changes in the resulting HTML TITLE tag. A suspected parameter is disqualified if one or more of the following criteria are satisfied: a) the parameter name is not sent in the URL; b) the parameter includes a single value; c) the number of values of the suspected parameter is above a predefined threshold; and, d) each parameter's value does not differ from its value in the referrer URL in a predefined number of appearances out of the total appearances of the value. It should be noted that each of the above disqualifiers is configurable, i.e., a user can select which of the disqualifiers to be used. In addition, the user can define additional disqualifiers. All suspected parameters that are not disqualified are the ADPs.

At S850, cross URLs ADPs are identified. A parameter is considered as an ADP for a group of URLs only if it exists in all URLs and if there is a relation between ADP's values in the group of URLs. At S860, based on the identified ADPs and cross URLs ADPs the ADs are defined. As mentioned above, an AD includes one or more conditions. For example, an AD may include the following conditions: "is a string in URL" and "does a parameter name exist in context." For the former condition the URL is the actual URL and for the latter condition the parameter name is an ADP name.

The methods and ALS 300 have been described in illustrative embodiments herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

Most preferably, the principles of the present invention are implemented as a combination of hardware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

It is to be further understood that, because some of the constituent system components and methods depicted in the accompanying drawings may be implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicants thus regards any means that can provide those functionalities as equivalent to those shown herein.

What is claimed is:

1. In a system that includes programming specific to learning and identifying transactions of web applications, a method for automatically learning web applications, comprising:

matching each of a plurality of incoming requests with a corresponding reply, thereby defining application contexts;

determining whether the application contexts belong to an identified web application and classifying those application contexts which do not belong to an identified web application as being unidentified application contexts;

applying a learning process on the unidentified application contexts to identify additional web applications and to identify individual transactions of the additional web applications; and filtering the incoming requests such that less than all of the incoming requests are matched with a corresponding reply for determination of whether application contexts belong to the identified web applications, wherein filtering the incoming requests further comprises checking the filtered requests against a data structure that indicates a plurality of the identified web applications and transactions of the identified web applications.

2. The method of claim 1, further comprising:

saving learnt information in a classify data structure (CDS), wherein the CDS is structured to indicate each identified web application and, within each identified web application, the modules which construct the identified web application; and generating a site tree based on the learnt information.

3. The method of claim 2, wherein the CDS includes: search modifiers, a uniform resource locator (URL) entity locator table, and URL entities.

4. The method of claim 3, wherein the search modifier includes a plurality of conditions utilized for replacing a request URL with a parameter value.

5. The method of claim 2, wherein generating the site tree includes designating a web site and all identified web applications, transactions and modules that belong to the designated web site and further includes displaying the site tree on a display.

6. The method of claim 1, wherein each application context includes a pair consisting of a request and its corresponding reply.

7. The method of claim 6, wherein the request is at least a hypertext transfer protocol (HTTP) request.

8. The method of claim 6, wherein the reply is at least a hypertext transfer protocol (HTTP) reply.

9. The method of claim 1, wherein the learning process being capable of identifying at least transactions, web applications, and modules of web applications.

10. The method of claim 9, wherein applying the learning process on unidentified application contexts further comprising:

for each application context, checking the application context against a plurality of application definers;

if at least one application definer is satisfied, generating a new application identification number; and inserting the application identification number together with a respective URL to a CDS (classify data structure).

11. The method of claim 10, wherein the application definer is a predefined condition.

12. The method of claim 11, wherein the application definer comprising at least one of: a string is in a URL, a string is in prefix of a URL, a parameter name exists in an application context, a parameter name and its value exist in an application context, a parameter name and a string is in its value exist in an application context, a cookie's path, or any combination thereof.

13. The method of claim 12, further being capable of automatically creating application definers.

14. A computer program product including a non-transitory computer-readable medium comprising software instructions operable to enable a computer to perform a method for automatically learning web applications, comprising:
    matching each of a plurality of incoming requests with a corresponding reply, thereby defining application contexts;
    determining whether the application contexts belong to an identified web application and classifying those application contexts which do not belong to an identified web application as being unidentified application contexts; and
    applying a learning process on the unidentified application contexts to identify additional web applications and to identify individual transactions of the additional web applications; and
    filtering the incoming requests such that less than all of the incoming requests are matched with a corresponding reply for determination of whether application contexts belong to the identified web applications, wherein filtering the incoming requests further comprises checking the filtered requests against a data structure that indicates a plurality of the identified web applications and transactions of the identified web applications.

15. The computer program product of claim 14, further comprising:
    saving learnt information in a classify data structure (CDS), wherein the CDS is structured to indicate each identified web application and, within each identified web application, the modules which construct the identified web application; and
    generating a site tree based on the learnt information.

16. The computer program product of claim 15, wherein the CDS includes: search modifiers, a uniform resource locator (URL) entity locator table, and URL entities.

17. The computer program product of claim 16, wherein the search modifier includes a plurality of conditions utilized for replacing a request URL with a parameter value.

18. The computer program product of claim 15, wherein generating the site tree includes designating a web site and all identified web applications, transactions and modules that belong to the designated web site and further includes displaying the site tree on a display.

19. The computer program product of claim 14, wherein each application context includes a pair consisting of a request and its corresponding reply.

20. The computer program product of claim 19, wherein the request is at least a hypertext transfer protocol (HTTP) request.

21. The computer program product of claim 19, wherein the reply is at least a hypertext transfer protocol (HTTP) reply.

22. The computer program product of claim 14, wherein the learning process being capable of identifying at least transactions, web applications, and modules of web applications.

23. The computer program product of claim 22, wherein applying the learning process on unidentified application contexts further comprising:
    for each application context, checking the application context against a plurality of application definers;
    if at least one application definer is satisfied, generating a new application identification number; and
    inserting the application identification number together with a respective URL to a CDS (classify data structure).

24. The computer program product of claim 23, wherein the application definer is a predefined condition.

25. The computer program product of claim 24, wherein the application definer includes at least one of: a string is in a URL, a string is in prefix of a URL, a parameter name exists in an application context, a parameter name and its value exist in an application context, a parameter name and a string is in its value exist in an application context, a cookie's path, or any combination thereof.

26. The computer program product of claim 25, further being capable of automatically creating application definers.

27. An apparatus operative in a data center and capable of automatically learning web applications of the data center, comprising:
    a filter for filtering incoming requests;
    a classifier for classifying the filtered requests to determine if the filtered requests belong to an identified web application;
    a collector for generating application contexts for those filtered requests which are classified as not belonging to any identified web application, thereby defining unidentified application contexts, each unidentified application context being a filtered request and a reply to the filtered request; and
    a learner for applying a learning process on unidentified application contexts, the learner being configured to identify additional web applications and to identify transactions of the additional web applications, the learner being further configured to generate updated information in response to identifying the additional web applications and the transactions of the additional web applications, wherein an operation of at least one of the filter, the classifier, the collector and the learner is executed by at least one processor,
    wherein the filter is configured to filter the incoming requests such that less than all of the incoming requests are matched with a corresponding reply for determination of whether application contexts belong to the identified web applications, wherein the filter is further configured to check the filtered requests against a data structure that indicates a plurality of the identified web applications and transactions of the identified web applications.

28. The apparatus of claim 27, further comprising:
    a first database for maintaining learnt information in the form of at least one of a classify data structure (CDS) and a site tree, the learnt information including the updated information;
    a second database for maintaining a plurality of application definers; and
    a third database for maintaining application contexts.

29. The apparatus of claim 28, wherein the CDS includes: search modifiers, a uniform resource locator (URL) entity locator table, and URL entities.

30. The apparatus of claim 28, wherein the site tree includes all identified web applications, transactions and modules that belong to a designated web site.

31. The apparatus of claim 27, wherein the filter filters requests at least according to URLs and HTTP methods.

32. The apparatus of claim 27, wherein the classifier classifies requests by checking the requests against a CDS.

33. The apparatus of claim 27, wherein the learning process being capable of identifying at least transactions, web applications, and modules of web applications.

34. The apparatus of claim 33, wherein the learner is configured to:
    for each application context, check the application context against a plurality of application definers;
    if at least one application definer is satisfied, generate a new application identification number; and insert the application identification number together with a respective URL to a CDS.

35. The apparatus of claim 34, wherein the application definer is a predefined condition.

36. The apparatus of claim 35, wherein the application definer includes at least one of: a string is in a URL, a string is in prefix of a URL, a parameter name exists in an application context, a parameter name and its value exist in an application context, a parameter name and a string is in its value exist in an application context, a cookie's path, or any combination thereof.

37. The apparatus of claim 36, further comprising an application definer creator for automatically creating application definers.

38. In a system that includes programming specific to learning and identifying transactions of web applications, a method for automatically learning web applications, comprising:
matching each of a plurality of incoming requests with a corresponding reply, thereby defining application contexts;
determining whether the application contexts belong to an identified web application and classifying those application contexts which do not belong to an identified web application as being unidentified application contexts; and
applying a learning process on the unidentified application contexts to identify additional web applications and to identify individual transactions of the additional web applications, wherein the learning process is capable of identifying at least transactions, web applications, and modules of web applications,
wherein applying the learning process on unidentified application contexts further comprising:
for each application context, checking the application context against a plurality of application definers;
if at least one application definer is satisfied, generating a new application identification number; and
inserting the application identification number together with a respective URL to a data structure.

39. A computer program product including a non-transitory computer-readable medium comprising software instructions operable to enable a computer to perform a method for automatically learning web applications, comprising:
matching each of a plurality of incoming requests with a corresponding reply, thereby defining application contexts;
determining whether the application contexts belong to an identified web application and classifying those application contexts which do not belong to an identified web application as being unidentified application contexts; and
applying a learning process on the unidentified application contexts to identify additional web applications and to identify individual transactions of the additional web applications, wherein the learning process is capable of identifying at least transactions, web applications, and modules of web applications,
wherein applying the learning process on unidentified application contexts further comprising:
for each application context, checking the application context against a plurality of application definers;
if at least one application definer is satisfied, generating a new application identification number; and
inserting the application identification number together with a respective URL to a data structure.

40. An apparatus operative in a data center and capable of automatically learning web applications of the data center, comprising:
a filter for filtering incoming requests;
a classifier for classifying the filtered requests to determine if the filtered requests belong to an identified web application;
a collector for generating application contexts for those filtered requests which are classified as not belonging to any identified web application, thereby defining unidentified application contexts, each unidentified application context being a filtered request and a reply to the filtered request; and
a learner for applying a learning process on unidentified application contexts, the learner being configured to identify additional web applications and to identify transactions of the additional web applications, the learner being further configured to generate updated information in response to identifying the additional web applications and the transactions of the additional web applications, wherein the learning process is capable of identifying at least transactions, web applications, and modules of web applications, wherein the learner is further configured to:
for each application context, check the application context against a plurality of application definers;
if at least one application definer is satisfied, generate a new application identification number; and
insert the application identification number together with a respective URL to a data structure,
wherein an operation of at least one of the filter, the classifier, the collector and the learner is executed by at least one processor.

* * * * *